US012499853B2

(12) United States Patent
Okada

(10) Patent No.: US 12,499,853 B2
(45) Date of Patent: Dec. 16, 2025

(54) DISPLAY CONTROL METHOD AND CONTROL DEVICE

(71) Applicant: Faurecia Clarion Electronics Co., Ltd., Saitama (JP)

(72) Inventor: Ryota Okada, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/609,217

(22) Filed: Mar. 19, 2024

(65) Prior Publication Data

US 2024/0323316 A1 Sep. 26, 2024

(30) Foreign Application Priority Data

Mar. 20, 2023 (JP) ................................ 2023-044686

(51) Int. Cl.
*G09G 5/00* (2006.01)

(52) U.S. Cl.
CPC ..... *G09G 5/005* (2013.01); *G09G 2340/0442* (2013.01); *G09G 2340/0464* (2013.01)

(58) Field of Classification Search
CPC .......... G09G 5/005; G09G 2340/0442; G09G 2340/0464; H04N 7/0122
See application file for complete search history.

(56) References Cited

U.S. PATENT DOCUMENTS

2016/0239250 A1* 8/2016 Kim ...................... G06F 3/1454
2018/0364881 A1* 12/2018 Lee ..................... G06F 3/04886

* cited by examiner

*Primary Examiner* — Brent D Castiaux
(74) *Attorney, Agent, or Firm* — Reising Ethington P.C.

(57) ABSTRACT

A first processing unit in a control device generates extended information and transmits to the external device extended information that can generate image information and extended content related to an image displayed on an external display (for example, a display of an external device), or extended content and image information based on the extended information. A second processing unit in the external device displays the image and extended content on an external display. Extended content is displayed in a blank region on the external display (i.e., an area other than the area where images are displayed on the external display).

9 Claims, 4 Drawing Sheets

DISPLAY CONTROL METHOD AND CONTROL DEVICE

CROSS REFERENCE TO RELATED APPLICATION

This patent application claims the benefit and priority of Japanese Patent Application No. 2023-044686, filed on Mar. 20, 2023, the disclosure of which is incorporated by reference herein in its entirety as part of the present application.

FIELD

The present invention generally relates to technology for displaying images on a display of an external device.

BACKGROUND

There is known technology that transmits an image generated by a control device (image transmission source device) to an external device (image transmission destination device) and displays the image on an external display (display of external device). This type of technology is disclosed, for example, in Patent Document 1 (US 2016/0239250).

If the aspect ratio of the image transmitted to the external device is different from the aspect ratio of the external display, a blank area where the image is not displayed is generated on the external display. The technology disclosed in Patent Document 1 still has a blank area where an image is not displayed on the external display.

Operations (for example, clicks or taps) performed by a user on the blank space generated on the external display may be a misoperation from the external device to the control device, depending on the specifications of the external device and the control device.

The problem with a blank space generated on external displays and techniques to effectively utilize such a blank space are neither disclosed nor suggested in the patent document.

Furthermore, the blank region on the external display may occur for reasons other than the difference between the aspect ratio of the image displayed on the external display and the aspect ratio of the external display.

SUMMARY

An object of the present application is to make effective use of a blank region on an external display.

A first processing unit in a control device generates extended information and transmits to the external device extended information that can generate image information and extended content related to an image displayed on an external display (for example, a display of an external device), or extended content and image information based on the extended information. A second processing unit in the external device displays the image and extended content on an external display. Extended content is displayed in a blank region on the external display (i.e., an area other than the area where images are displayed on the external display).

The blank region created on the external display can be effectively utilized by using one or more embodiments of the present invention. The following description of the embodiments will elucidate the problems, configurations, and effects other than those described above.

DETAILED DESCRIPTION OF EMBODIMENTS

An embodiment of the present application is described below with reference to the figures. In the embodiment, an automotive device is used as an example of a control device, but the control device may be a device other than an automotive device.

Figure 1:
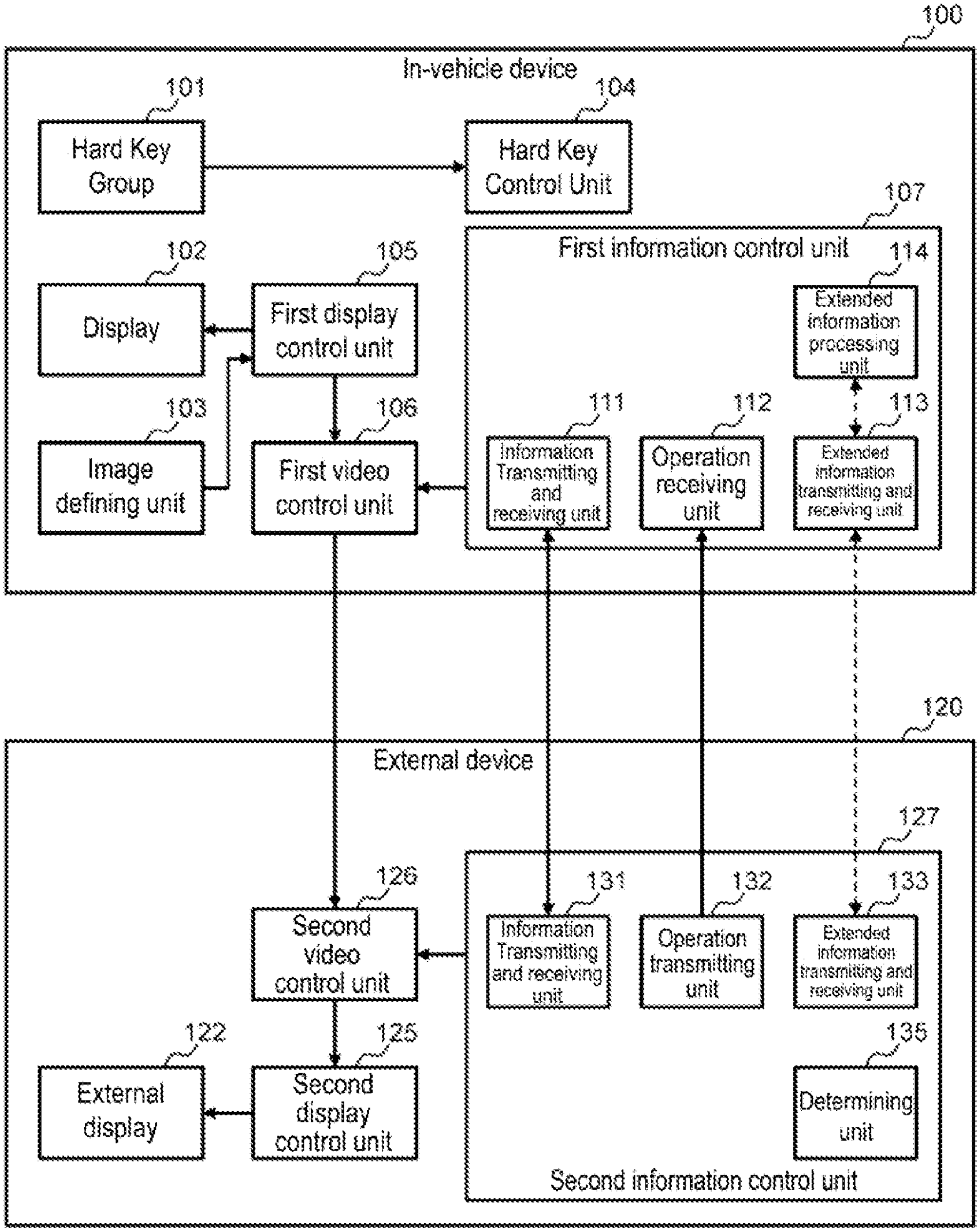
FIG. 1 is a diagram depicting an overall configuration of the system according to an embodiment of the present application.

FIG. 1 is a diagram depicting an overall configuration of the system according to an embodiment of the present application.

The automotive device 100 can communicate wirelessly with the external device 120 using Wi-Fi (registered trademark) or Ethernet (registered trademark). For example, the automotive device 100 can function as an access point. The external device 120 can be an information processing terminal such as a smartphone or tablet device of a user in the driver's seat or another seat.

The automotive device 100 is connected to an interface device, input/output device, storage device, and processor, which are not depicted in the figure. The automotive device 100 communicates with the external device 120 via the interface device. The input/output device can be a group of hard keys 101 and a display 102. The hard key group 101 is a plurality of hard keys. Hard keys are physical keys (for example, buttons). The display 102 may be a touch panel.

The storage device stores data and computer programs. When the processor executes a computer program, functions such as image defining unit 103, hard key control unit 104, display control unit 105, first video control unit 106, and first information control unit 107 are realized. The first processing unit may be employed as a function that includes the first video control unit 106 and the first information control unit 107. The first processing unit may further include an image defining unit 103 and a first display control unit 105.

The hard key control unit 104 detects an operation performed on the hard key group 101 and causes the automotive device 100 to perform actions (for example, start or end car navigation, volume adjustment, or the like) in response to the operation.

The image defining unit 103 generates image information expressing an image (for example, a screen) to be displayed on the display 102, and the first display control unit 105 displays the image expressed by that image information on the display 102. The aspect ratio (and screen resolution) of the image expressed by the generated image information follows the aspect ratio (and screen resolution) of the display 102.

The image defining unit 103 or the first display control unit 105 generates image information expressing the image to be displayed on the external display 122 (also called the display of the external device 120), in addition to image information expressing the image to be displayed on the display 102. In other words, the screen defining unit 103 or the first display control unit 105 transforms the image based on the length of the long side or short side of the external display 122 while maintaining the aspect ratio of the image. For example, the screen defining unit 103 or the first display control unit 105 generates an image that matches the length of the long or short side of the external display 122 while maintaining the aspect ratio of the image to be the same as the aspect ratio of the display 102. Specifically, for example, the mode of image generation can be at least one of Mirroring mode and Extension mode. In Mirroring mode, the image defining unit 103 generates image information for the external device 120 for the same image that is displayed on the display 102. In Extension mode, the screen defining unit 103 generates image information for the external device 120 for a different image than that displayed on the display 102.

The first video control unit 106 sends image information expressing the image to be displayed on the external display 122 to the external device 120. Image information is, for example, encoded (as compressed information) and sent to the external device 120 via RTP (Real-time Transport Protocol).

The first information control unit 107 sends and receives extended information or other information (for example, information expressing the aspect ratio (screen resolution) of the display 102 and/or external display 1222) related to the image information transmitted by the first video control unit 106 to the external device 120. The first information control unit 107 includes, for example, functions such as an information transmitting and receiving unit 111, an operation receiving unit 112, an extended information transmitting and receiving unit 113, and an extended information processing unit 114 (these functions are described below).

The external device 120, not depicted, has an interface device, input/output device, storage device, and a processor connected thereto. The external device 120 communicates with the automotive device 100 via the interface device. The input/output device can be an external display 122. The external display 122 is typically a touch panel display.

The storage device stores data and computer programs. When the processor executes a computer program, functions such as the second information control unit 127, the second video control unit 126, and the second display control unit 125 are realized. The second processing unit may be employed as a function that includes the second video control unit 126 and the second information control unit 127. The second processing unit may further include a second display control unit 125.

The second information control unit 127 transmits and receives to the automotive device 100 extended information or other information related to the image information received by the second video control unit 126. The second information control unit 127 includes, for example, functions such as an information transmitting and receiving unit 131, an operation receiving unit 132, an extended information transmitting and receiving unit 133, and a determining unit 135 (these functions are described below).

The second video control unit 126 receives image information expressing an image to be displayed on the external display 122 from the automotive device 100. The image information is decoded, for example, and the decoded image information is passed to the second display control unit 125. The second display control unit 125 displays the image expressed by the image information on the external display 122.

The following is an example of the process performed by this embodiment.

The first processing unit in the automotive device 100 (example of a control device) transmits to the external device 120 extended information that can generate image information and extended content related to an image displayed on an external display 122, or extended content and image information based on the extended information. A second processing unit in the external device 120 displays the image and extended content on an external display 122. Extended content is displayed in a blank region on the external display (i.e., an area other than the area where images are displayed on the external display). Specifically, the automotive device 100 is provided with a first information control unit 107 that generates extended information capable of generating extended content, and a first video control unit 106 that transmits image information and extended information related to images displayed on the external display 122, or extended content and image information based on the extended information to the external device 120. For example, the extended information is information that expresses extended content and that enables the first video control unit 106 or the second video control unit 126 to generate extended content. Extended content is content that is displayed in blank regions, which are regions other than the region where the image (image from the automotive device 100) is displayed among the regions where the external display 122 is capable of displaying images. The second video control unit 126 displays the image and extended content on the external display 122, for example, via the second display control unit 125. Because the extended content is displayed in the blank region of the external display 122, the blank region of the external display 122 can be used effectively.

Figure 2:
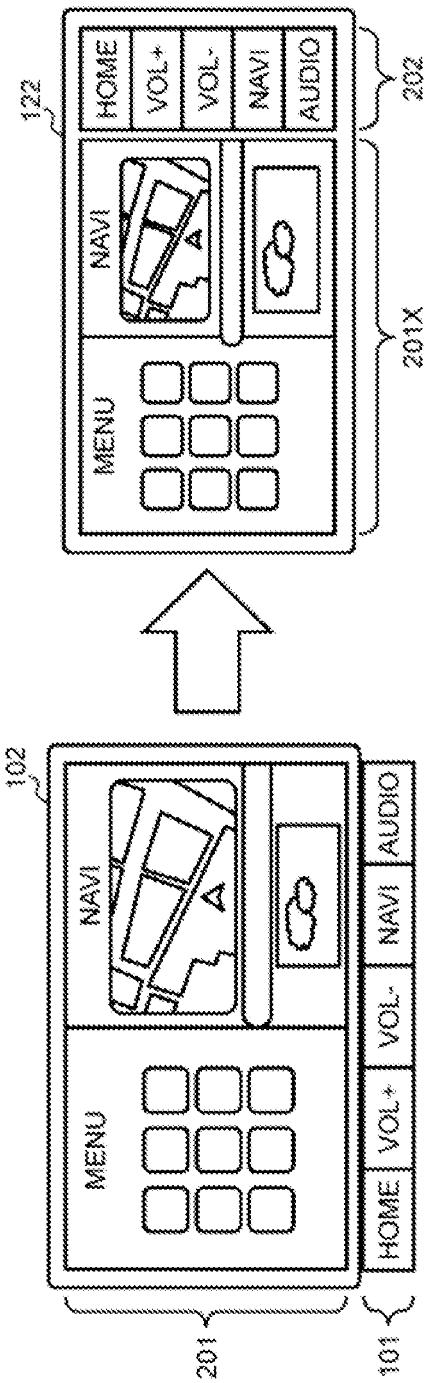
FIG. 2 depicts an example of a display in Mirroring mode.

An example of the display when the mode of image generation is Mirroring mode is depicted in FIG. 2. In other words, in Mirroring mode, the image 201 is displayed on the display 12 of the automotive device 100. The image defining unit 103 can determine the aspect ratio (and resolution) of the image 201 based on the aspect ratio (and screen resolution) of the display 102. For example, if the aspect ratios are the same, as depicted in FIG. 2, the display 102 will not have any blank regions. However, the image 201X displayed on the external display 122 corresponds to a duplicate of image 201. Therefore, the image 201X displayed on the external display 122 is an image that maintains the aspect ratio of the display 102. If the aspect ratio of the display 102 and the aspect ratio of the external display 122 are different, the external display 122 will have blank regions as regions other than the display region of the image 201X. In the present embodiment, the extended content 202 is displayed in the blank region.

Figure 3:
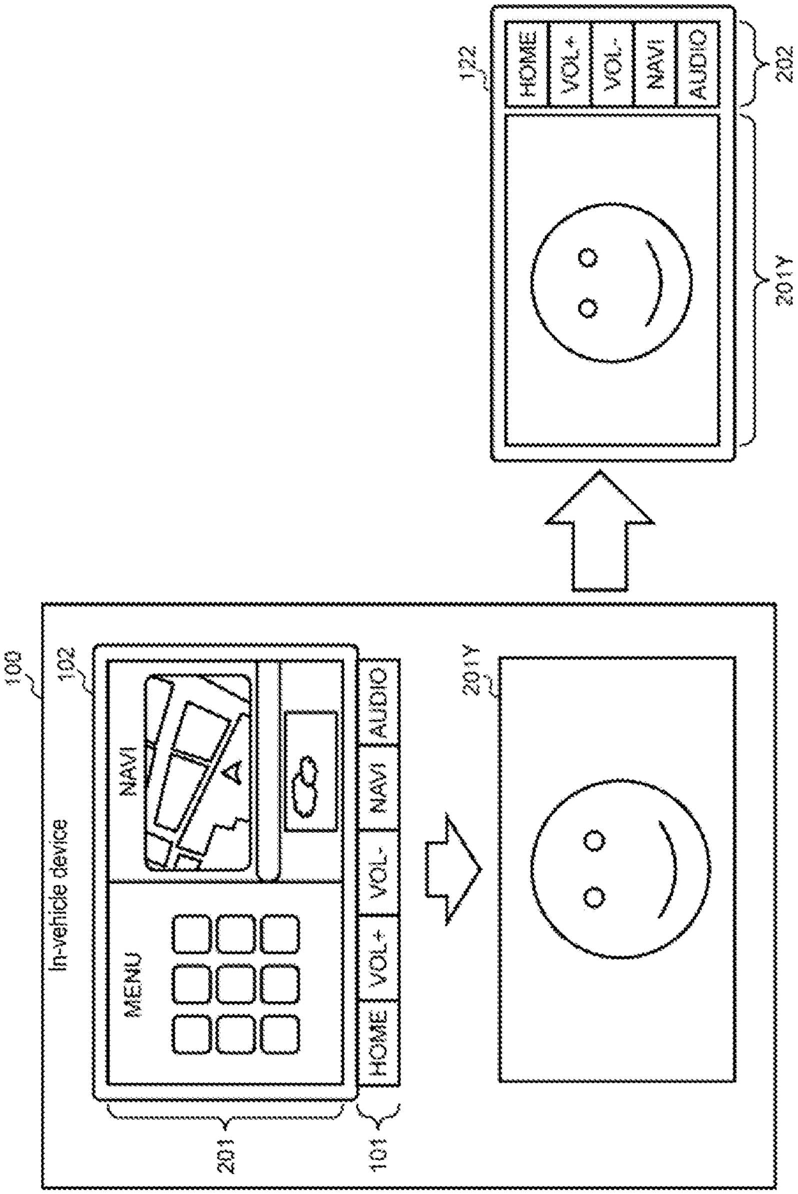
FIG. 3 depicts an example of a display in Extension mode.

An example of the display when the mode of image generation is Extension mode is depicted in FIG. 3. The image defining unit 103 or the first display control unit 105 generates an image 201Y that is different from the image 201 displayed on the display 102 of the automotive device 100. The aspect ratio (and resolution) of the image 201Y may be the same as or different from the aspect ratio of image 201. If the aspect ratio of the image 201Y and the aspect ratio of the external display 122 are different, the external display 122 will have blank regions as regions other than the display region of the image 201Y. In the present embodiment, the extended content 202 is displayed in the blank region.

The blank region of the external display 122 can be the region created by the difference between the aspect ratio of the image 201X or 201Y and the aspect ratio of the external display 122. The size of the extended content 202 displayed in the blank region may be based on the aspect ratio of the image 201X or 201Y and the aspect ratio of the external display 122. This allows the extended content 202 to occupy the entire blank region, thereby solving the problem caused by the blank region, such as malfunctioning of the automotive device 100 due to user operation on the blank region. For example, the aspect ratio of the image 201 expressed by the image information generated in the automotive device 100 may be based on the aspect ratio of the display 102, and the aspect ratio of the image 201X or 201Y displayed on the external display 122 may be an aspect ratio determined based on the aspect ratio of the display 102 of the automotive device 100.

The extended content 202 is content that is different from the images 201X and 201Y displayed on the external display 122. This allows for effective use of the blank region on the external display 122. For example, the extended content 202 can be a soft key group having the same soft keys as the hard key group 101, as depicted in FIGS. 2 and 3. This allows the same operations to be performed from the external device 120 as the operations performed using the hard key group 101 of the automotive device 100. Furthermore, the automotive device 100 may have other control units (user interface) in place of or in addition to the hard key group 101, and may be provided with extended content 202 assigned to function as the control unit. Furthermore, the extended content 202 may be content that includes information on the automotive device 100 side (for example, arrival time at a destination, route information, vehicle speed, and the like), or content for operating functions (for example, music fast forward/rewind) in line with the image 201X or 201Y currently displayed on the external display 122. This improves convenience for a user operating the external device 120.

The automotive device 100 can know the aspect ratio (and screen resolution) of the external display 122, for example, by the following method. The information transmitting and receiving unit 111 of the first information control unit 107 transmits a query (for example, a query about the specifications of the external device 120) to the information transmitting and receiving unit 131 of the second information control unit 127. The information transmitting and receiving unit 111 receives information indicating the aspect ratio (and screen resolution) of the external display 122 as a response to the query. The extended information processing unit 114 can generate extended information expressing extended content based on the aspect ratio (and screen resolution) of the external display 122. For example, the extended content is placed across the entire blank region created on the external display 122. Note that the information transmitting and receiving unit 111 of the first information control unit 107 may transmit information expressing the aspect ratio (and resolution) of the image 201X or 201Y to the information transmitting and receiving unit 131 of the second information control unit 127. Furthermore, the information transmitted from the first information control unit 107 to the second information control unit 127 that is associated with the image information transmitted from the first video control unit 106 to the second video control unit 126 may be transmitted and associated with the image information.

Figure 4A:
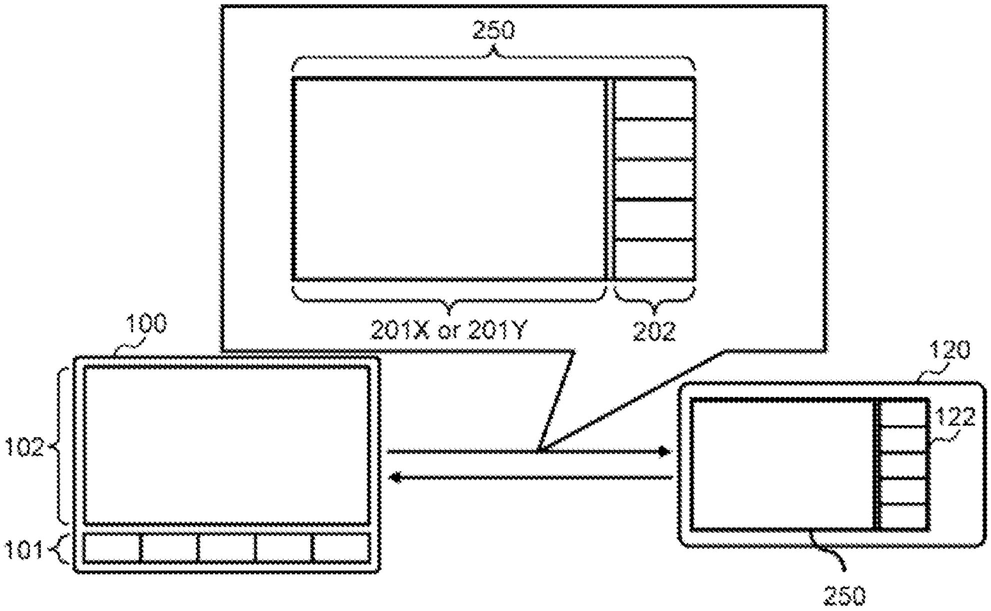
FIG. 4A depicts an example of providing extended content.
Figure 4B:
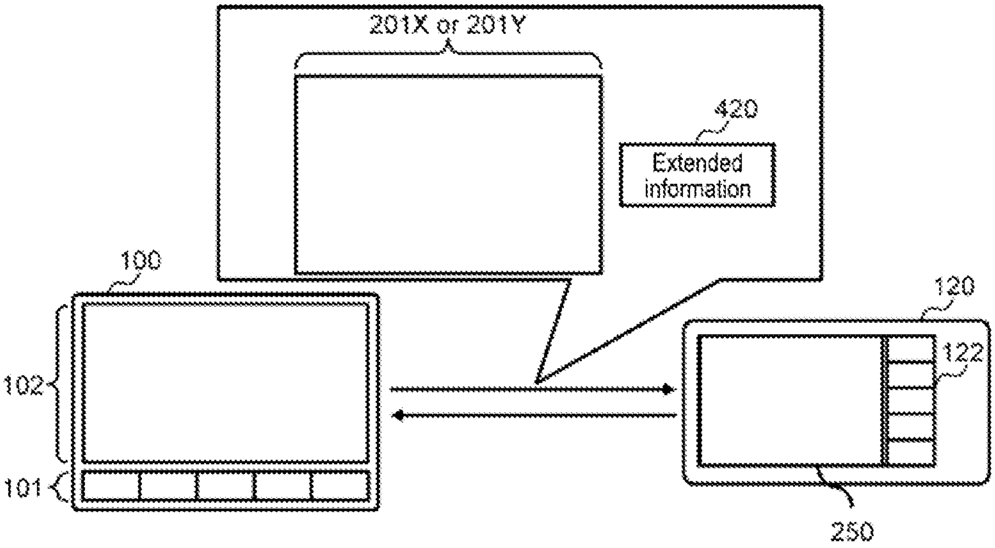
FIG. 4B depicts another example of providing extended content.

There are two methods of providing extended content, for example, the method depicted in FIG. 4A and the method depicted in FIG. 4B.

According to FIG. 4A, the automotive device 100 transmits image information expressing the composite image 250 to the external device 120. The first video control unit 106 receives extended information from the first information control unit 107, receives image information from the first display control unit 105, and generates a composite image that is an image including an image expressed by the image information and extended content generated from the extended information (extended content placed in a blank region), based on the image information and extended information. In other words, the first video control unit 106 generates a composite image 250, which is an image containing the image 201X or 201Y and the extended content 202 placed in the position corresponding to the blank region. The first video control unit 106 transmits image information expressing the composite image 250 to the second video control unit 126 of the external device 120. The second video control unit 126 receives the image information and displays the composite image 250 expressed by the image information on the external display 122 through the second display control unit 125. The extended content 202 in the composite image 250 is placed in the blank region (a region of the external display 122 other than image 201X or 201Y) that occurs on the external display 122. The image and extended content displayed on the external display 122 by the second video control unit 126 through the second display control unit 125 are image 201X or 201Y and extended content 202 in the composite image 250 expressed by the image information. With this method, the external device 120 displays a composite image 250. Therefore, there is no need in particular for the external device 120 to have functions such as determining the location of the extended content 202.

In FIG. 4B, the automotive device 100 transmits the image information and the extended information 420 to the external device 120. Extended information 420 is typically associated with the image information. Extended information 420 is information that enables the second video control unit to generate extended content. For example, the information transmitting and receiving unit 113 of the first information control unit 107 transmits extended information to the extended information transmitting and receiving unit 133 of the second information control unit 127, which allows the second video control unit 126 to generate extended content. The extended information transmitting and receiving unit 113 transmits extended information to the second video control unit 126 via the extended information transmitting and receiving unit 133, which allows the second video control unit 126 to generate extended content. For example, the extended content is associated with the image information transmitted from the first video control unit 106. The second video control unit 126 displays the image 201X or 201Y expressed by the image information on the external display 122, and displays the extended content based on the extended information in a blank region of the external display 122. This is expected to reduce the amount (size) of information transmitted from the automotive device 100 to the external device 120, as compared to the method depicted in FIG. 4A. Note that in the method depicted in FIG. 4B, for example, the second video control unit 126 may identify the aspect ratio (and resolution) of the image 201X or 201Y from the received image information, or alternatively from the information obtained by communication between the information transmitting and receiving units 111 and 131. The second video control unit 126 identifies the range of the blank region from the identified aspect ratio and the aspect ratio of the external display 122, and may display the extended content based on extended information from the second information control unit 127 in the identified blank region. Specifically, for example, the second video control unit 126 receives image information from the first video control unit 106, receives extended information 420 from the first information control unit 107 through the second information control unit 127, and generates image information expressing the composite image 250, an image containing an image and extended content, based on the image information and the extended information. The second video control unit 126 may display the composite image 250 expressed by the image information on the external display 122 through the second display control unit 125. If this method is performed on the same external device 120 as in FIG. 4A, the external device 120 can eventually display an image similar to the composite image 250.

When the determining unit 135 of the second information control unit 127 accepts an operation by the user on the external display 122, the determining unit 135 may determine whether the subject of the operation is an image 201X or 201Y or extended content 202. The operation transmitting unit 132 may transmit operation information expressing the result of the determination and the content of the operation to the automotive device 100. The operation receiving unit 112 of the first information control unit 107 receives the operation information. The first information control unit 107 may respond to the operation information and perform processing based on the operation information. For example, in the case of an operation on image 201X or 201Y, the first information control unit 107 causes the image defining unit 103 or the first display control unit 105 to update the image 201X or 201Y on the external display 122. Furthermore, the first video control unit 106 may then transmit the image information expressing the updated image 201X or 201Y to the external device 120. Furthermore, for example, in the case of an operation regarding the extended content 202, the first information control unit 107 may increase or decrease the sound volume of the output, or the like.

Note that the present invention is not limited to the abovementioned embodiment and includes various modified examples. For example, while the abovementioned embodiment has been described in detail in order to describe the present invention in an easy-to-understand manner, the present invention is not necessarily limited to configurations with all the described configurations. Moreover, not only the deletion of such configurations, but also the replacement or addition of configurations is possible.

The present invention is applicable to all devices with displays, not just automotive devices. For example, the present invention is applicable to all systems in which one device generates images to be displayed on another device. For example, the invention is applicable when the aspect ratio of the image generated by one device is different from the aspect ratio of the display provided on the other device.

The invention claimed is:

1. An image display method, comprising the steps of:

a first processing unit provided in a control unit generating extended information;

the first processing unit transmitting to an external device image information related to the image displayed on the display of the external device, and extended information capable of generating extended content, or extended content and image information based on the extended information;

a second processing unit provided in the external device displaying the image and the extended content on the display of the external device;

when the second processing unit receives an operation by the user on the display of the external device, the second processing unit determines whether the subject of the operation is the image or the extended content;

the second processing unit transmits the operation information expressing the determination results and the content of the operation to the control unit; and the first processing unit performs processing according to the operation information in response to the operation information, wherein the extended content is displayed in a blank region on the display of the external device, which is a region other than the region where the image is displayed, and wherein the extended content is information on the control unit or a user interface for operation.

2. The image display method according to claim 1, wherein the first processing unit generates a composite image, which is an image containing the image and the extended content to be placed in the blank region, based on the image information and the extended information, wherein the first processing unit transmits information expressing the composite image including the image based on the image information and the extended content based on the extended information to the external device, and the second processing unit displays the composite image on the display of the external device.

3. The image display method according to claim 1, wherein the second processing unit generates image information expressing a composite image, which is an image containing the image and the extended content placed in the blank region, based on the image information related to the image displayed on the display of the external device and the extended information that can generate extended content, wherein the second processing unit displays the composite image on the display of the external device.

4. The image display method according to claim 1, wherein the first processing unit transforms the image based on the length of the long or short side of the aspect ratio of the display of the external device, while maintaining the aspect ratio of the image.

5. The image display method according to claim 4, wherein the aspect ratio of the image expressing the image information generated in the control device is based on the aspect ratio of the display of the control device, and the aspect ratio of the image displayed on the display of the external device is an aspect ratio determined based on the aspect ratio of the display of the control device.

6. The image display method according to claim 1, wherein the extended content is content that is different from the image that is displayed on the display of the external device.

7. The image display method according to claim 1, wherein the control unit is an in-vehicle device, and the external device is an information processing terminal of a user seated in a driver's seat or another seat.

8. The image display method according to claim 1, wherein the user interface for operation is a group of software keys configured to correspond to a group of hardware keys provided in the control unit.

9. A control device, comprising:

an information control unit that generates extended information capable of generating extended content; and a video control unit that transmits information expressing a composite image in which the extended content is combined with the image, based on the extended information and the image information of the image, wherein the extended content in the composite image is placed in a region other than the region where the image is displayed on the display of the external device, wherein the control device is configured to receive operation information from an external device, the operation information pertains to an operation by a user of a display of the external device and whether the subject of the operation is the image or the extended content, the control device is also configured to receive the content of the operation from the external device, wherein the control device is configured to perform processing according to the operation information, and wherein the extended content is information on the control device or a user interface for operation.

* * * * *